(No Model.) 7 Sheets—Sheet 1.
G. H. WILKINS.
MACHINE FOR WINDING SPOOLS.
No. 376,124. Patented Jan. 10, 1888.
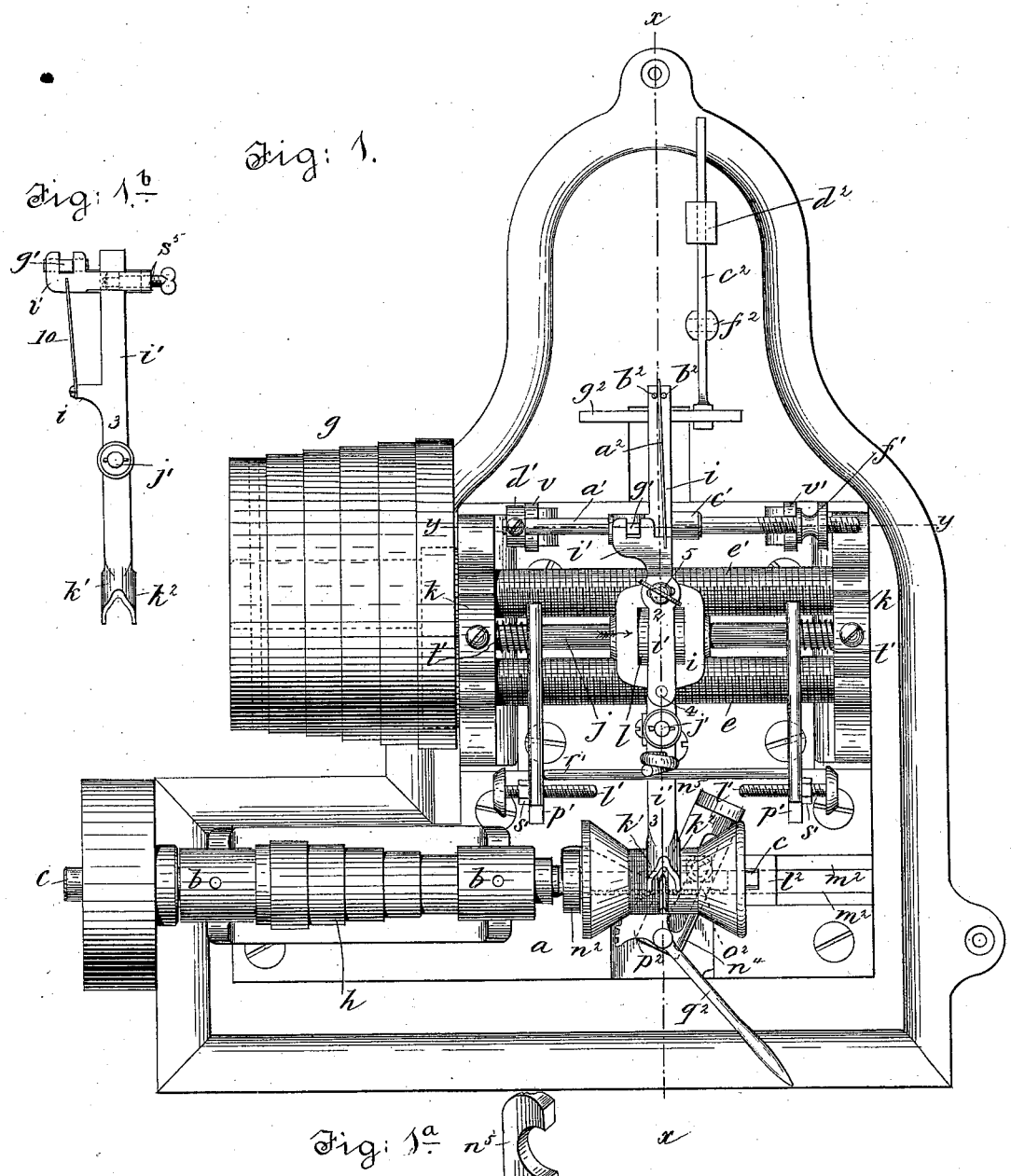
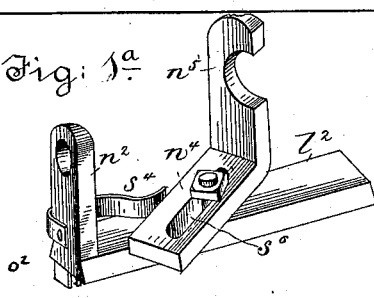

(No Model.) 7 Sheets—Sheet 2.
G. H. WILKINS.
MACHINE FOR WINDING SPOOLS.
No. 376,124. Patented Jan. 10, 1888.
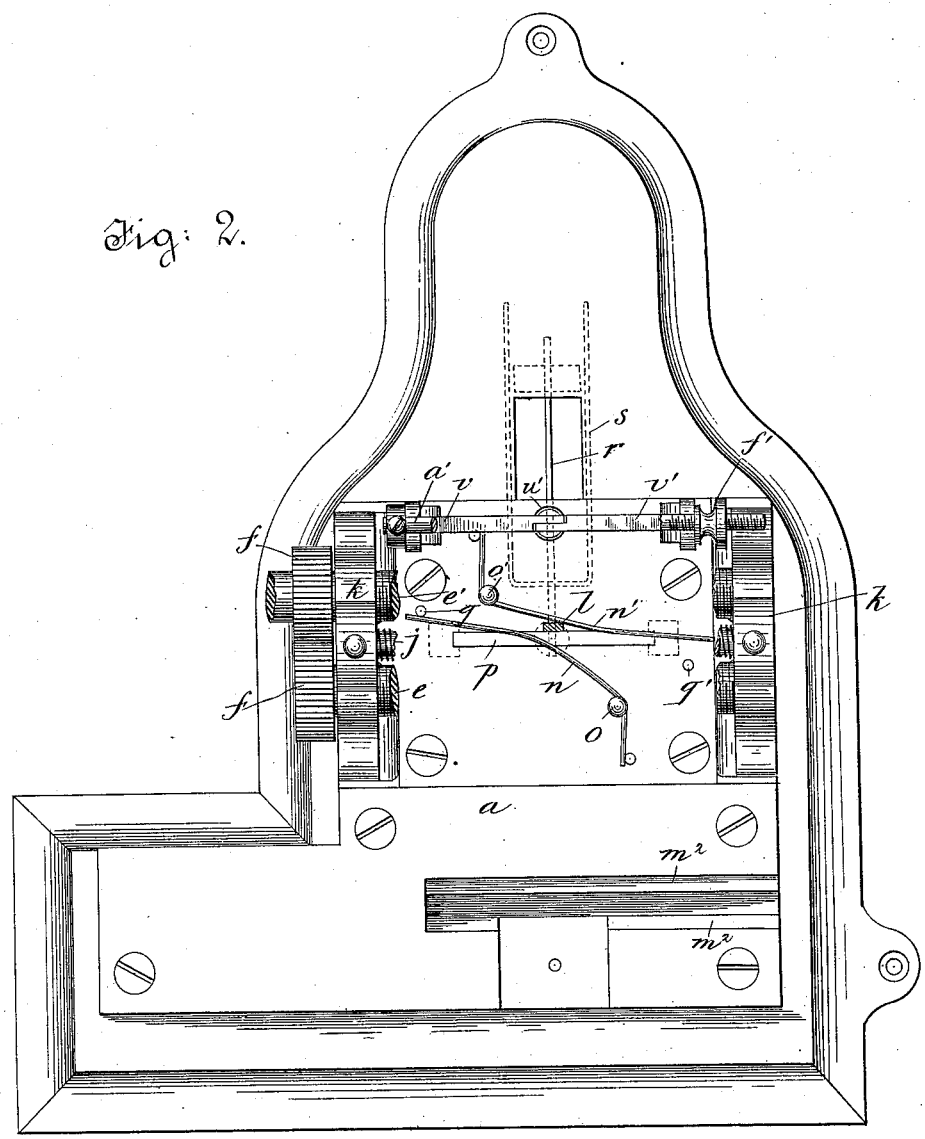

(No Model.) 7 Sheets—Sheet 3.
G. H. WILKINS.
MACHINE FOR WINDING SPOOLS.

No. 376,124. Patented Jan. 10, 1888.

Witnesses:
John A. Rennie,
John Long,

Inventor,
G. H. Wilkins
by Knight Brown & Crossley
Attys.

(No Model.) 7 Sheets—Sheet 4.
G. H. WILKINS.
MACHINE FOR WINDING SPOOLS.
No. 376,124. Patented Jan. 10, 1888.
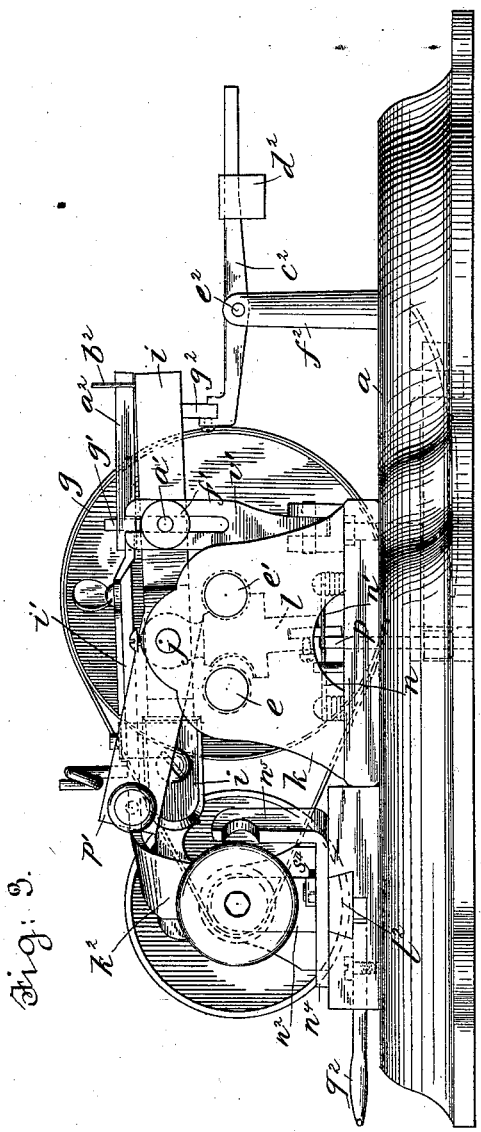
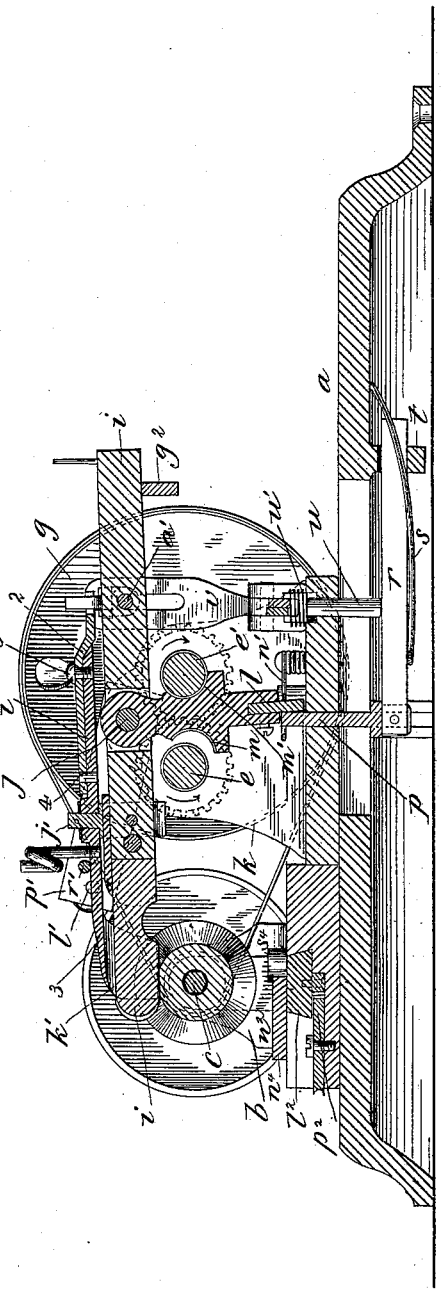

(No Model.) 7 Sheets—Sheet 5.

G. H. WILKINS.
MACHINE FOR WINDING SPOOLS.

No. 376,124. Patented Jan. 10, 1888.

Witnesses:
John A. Rennie
John Long

Inventor,
G. H. Wilkins
by Knight Brown Quinby
Attys.

(No Model.) 7 Sheets—Sheet 6.

G. H. WILKINS.
MACHINE FOR WINDING SPOOLS.

No. 376,124. Patented Jan. 10, 1888.

(No Model.) 7 Sheets—Sheet 7.
G. H. WILKINS.
MACHINE FOR WINDING SPOOLS.
No. 376,124. Patented Jan. 10, 1888.
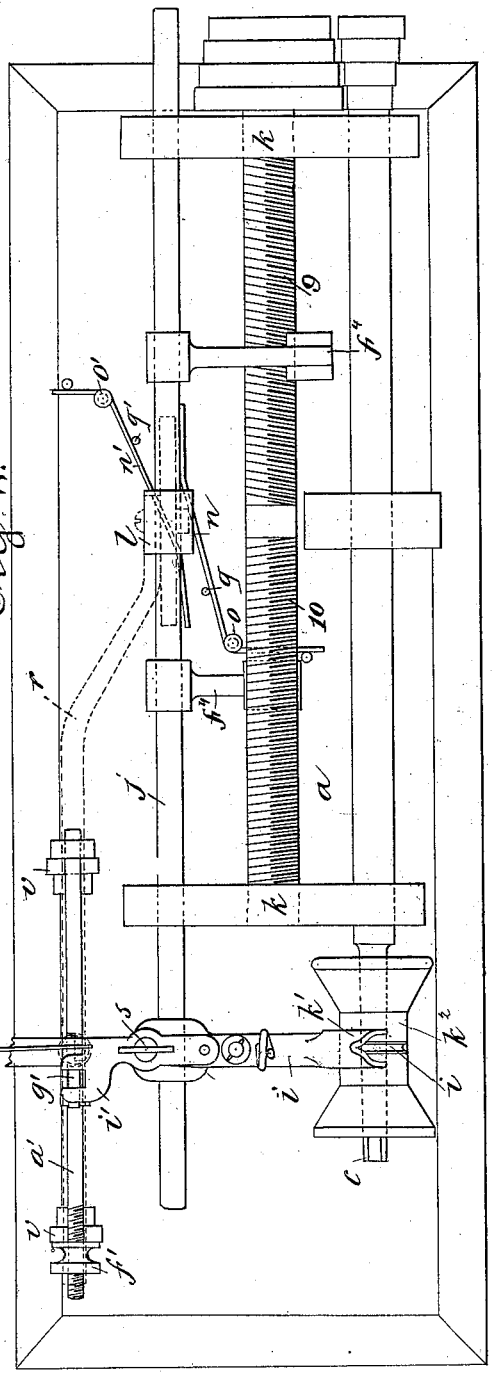
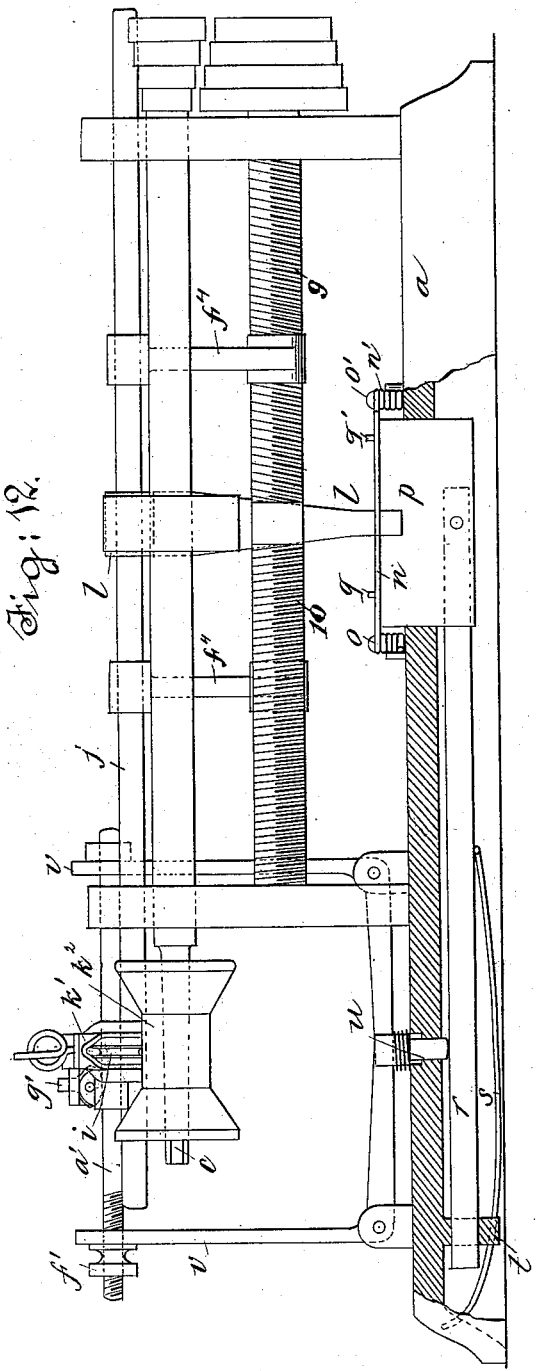

UNITED STATES PATENT OFFICE.

GEORGE H. WILKINS, OF SHELBURNE FALLS, MASSACHUSETTS, ASSIGNOR, BY DIRECT AND MESNE ASSIGNMENTS, OF TWELVE TWENTY-FIFTHS TO HERBERT H. SANDERSON, OF NEW YORK, N. Y., AND FRANCIS H. MAYHEW, OF SHELBURNE FALLS, MASSACHUSETTS.

MACHINE FOR WINDING SPOOLS.

SPECIFICATION forming part of Letters Patent No. 376,124, dated January 10, 1888.

Application filed August 23, 1886. Serial No. 211,593. (No model.)

*To all whom it may concern:*

Be it known that I, GEORGE H. WILKINS, of Shelburne Falls, in the county of Franklin and State of Massachusetts, have invented certain new and useful Improvements in Machines for Winding Spools, of which the following is a specification.

This invention has for its object to improve the construction and operation of that class of machines for winding spools in which the length of the successive courses is determined by the shape of the spool-heads; and it consists in the several improvements which I will now proceed to describe and claim.

Figure 5:
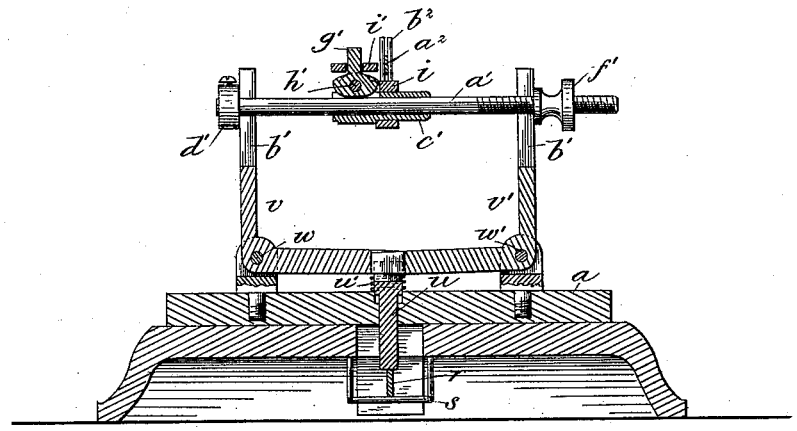
Figure 6:
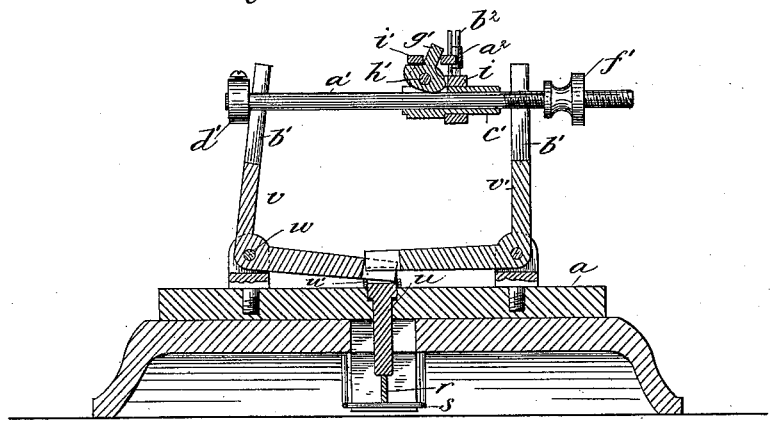
Figure 9:
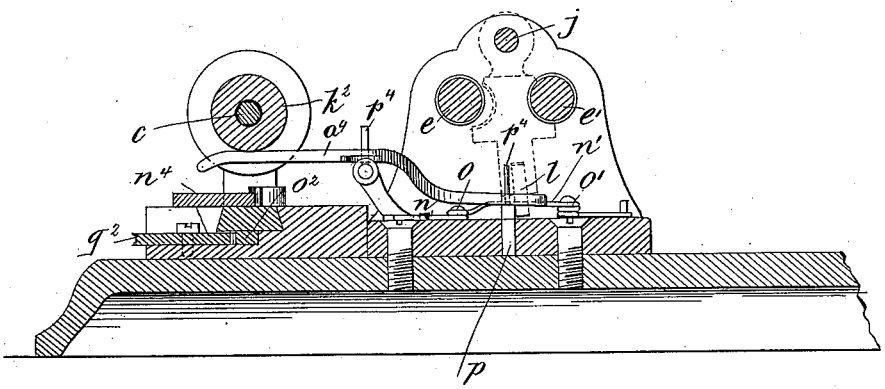
Figure 10:
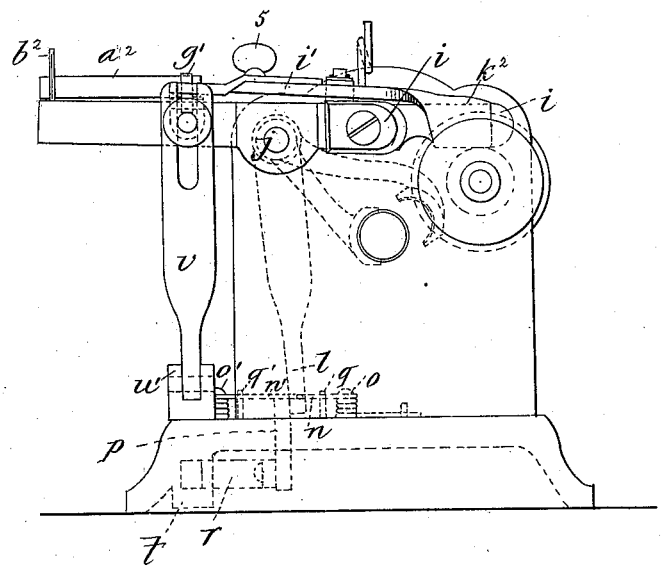
Figure 8:
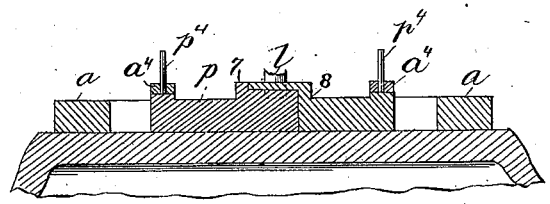
Figure 7:
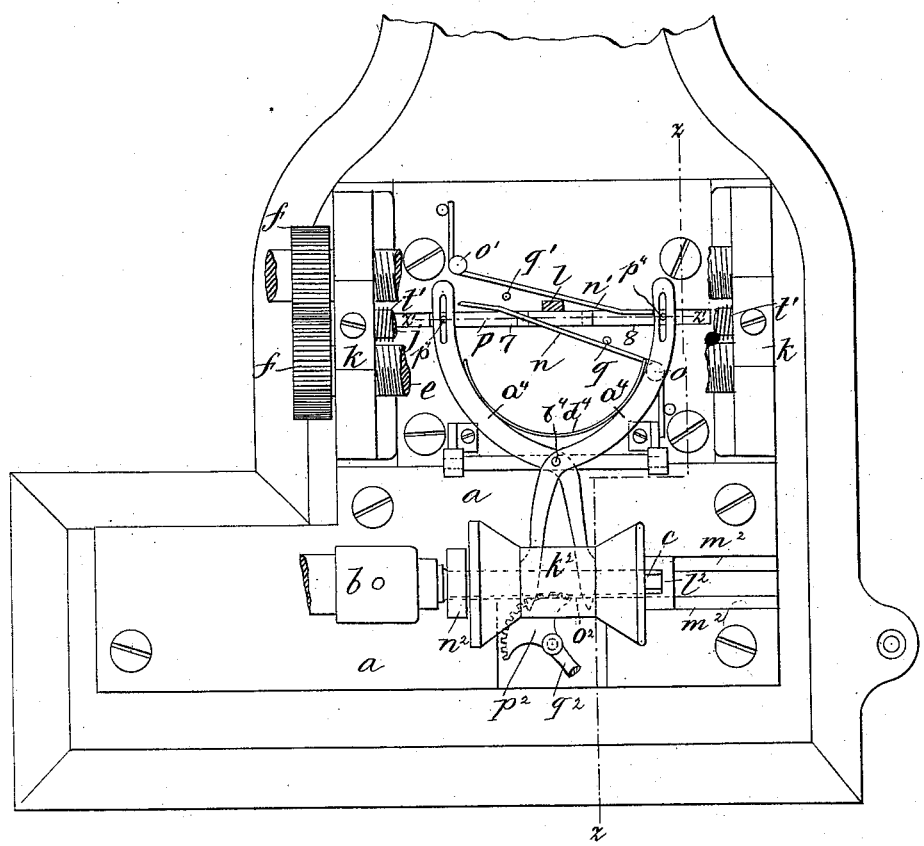

Of the accompanying drawings, forming a part of this specification, Figure 1 represents a top view of a machine for winding spools embodying my invention. Fig. 2 represents a similar view with a part of the mechanism broken away. Fig. 3 represents a side elevation. Fig. 4 represents a section on line *x x*, Fig. 1. Fig. 5 represents a section on line *y y*, Fig. 1. Fig. 6 represents a view like Fig. 5, with certain parts in different positions. Fig. 7 represents a top view of a modification; Fig. 8, a section on line *z' z'*, Fig. 7; Fig. 9, a section on line *z z*, Fig. 7. Fig. 10 represents an end view of another modification. Figs. 11 and 12 represent, respectively, top and front views of the modification shown in Fig. 10. Figs. 1ª and 1ᵇ represent detail views.

The same letters of reference indicate the same parts in all the figures.

In the drawings, *a* represents the supporting-base, having suitable standards or bearings, *b b* and *k k*, in which are journaled the shaft or spindle *c*, on which the spool to be wound is placed, and the feeding-screws *e e'*. Said screws are connected by gears *f f*, Fig. 2, so that they are rotated in opposite directions. The screw *e'* is provided with a differential pulley, *g*, which is belted to a differential pulley, *h*, on the shaft or spindle *c*, the screws *e e'* being thus rotated.

*i* represents a thread-carrier mounted to slide on a rod, *j*, which is supported by the standards *k k*, in which the screws *e e'* are journaled. Said carrier has a grooved forward end, which projects over the spool on the spindle *c* and delivers the thread in courses to said spool. In the central portion of the carrier is an opening, through which passes the rod *j*, on which the carrier slides.

*l* represents a short arm mounted on the rod *j* within the opening in the thread-carrier, which arm extends downwardly between the screws *e e'*, and is adapted both to oscillate on the rod *j* and to slide thereon with the thread-carrier. In the opposite sides of the arm *l* are formed half-nuts *m m'*, Fig. 4, adapted to engage, respectively, with the screws *e e'*. The arm *l* has a play between said screws, and when moved to one extreme of its oscillating movement one of its half-nuts is engaged with one screw, and when moved to the other extreme its other half-nut is engaged with the other screw. It will be seen, therefore, that the thread-carrier will be moved in one direction when the arm *l* is in contact with one screw and in the opposite direction when said arm is in contact with the other screw.

In machines of this class, in which a thread-carrier is reciprocated by the action of oppositely-rotating screws of like pitch, or of a right and left screw formed in one upon nuts connected with the thread-carrier, automatic devices are provided whereby the movements of the carrier are reversed after each course of thread has been completed. The spools upon which the thread is wound have end flanges which are tapered or frusto-conical at their inner faces, so that each course of thread has to be somewhat longer than the preceding course to fit the courses to the tapered heads.

Heretofore the increase in the length of the successive courses has been determined by devices entirely independent of the spool-heads, the increase in the length of each course being arbitrary, so that unless the spool-heads are formed in exact accordance with the operation of the course-lengthening devices the ends of the courses will be imperfectly formed. It has been necessary, therefore, to change or adjust the course-lengthening devices to accommodate them to spools of different form from that to which they had previously been adjusted. Moreover, there must be such nicety of adjustment or correspondence between the course-lengthening devices and the taper of the spool-heads that it has been difficult to secure the desired uniformity and perfection of winding.

I have obviated the objections above referred to by providing automatic devices which are acted on directly by the conical heads of the spools, so that the length of each course is determined by and fitted to the inclination of the spool-heads, and no adjustment or adaptation is required to enable the machine to operate with spools having differently-formed heads. To this end I have provided automatic means whereby pressure is applied to the arm $l$, having the half-nuts $m$ $m'$, during the latter part of each movement of the carrier, such pressure tending to separate the arm from the screw with which it is for the time being engaged and force said arm into engagement with the other screw, a movable guide or abutment which supports the arm against said pressure until the course of thread being wound has reached its proper length, and mechanism whereby the position of said abutment is varied, so that it will release the arm and permit the pressure applied thereto to move it into engagement with the other screw when each course is completed, a part of said mechanism being in contact with the spool, so that the action of the mechanism in reversing the movement of the thread-carrier is caused by the head of the spool.

Referring to Figs. 1, 2, 3, and 4 of the drawings, $n$ $n'$ represent springs supported by studs $o$ $o'$ on the base $a$ and arranged as shown in Fig. 2. Said springs bear alternately on the lower portion of the arm $l$, having the half-nuts, and each spring when in action presses said arm against a movable bar or abutment, $p$, which, when in operative position, projects upwardly through a slot in the base $a$ and stands parallel with the screws $e$ $e'$. The movement of the arm $l$ with the carrier is from the fixed to the free end of the spring bearing against said arm, and the arm in moving with the carrier does not come in contact with the spring until the carrier has made a part of its movement. When the arm comes in contact with one of the springs, it gradually displaces said spring, as indicated in Fig. 2, the springs normally bearing at their free ends against stops $q$ $q'$ on the base $a$. When the course of thread laid on the spool by one movement of the carrier has reached the proper length, the abutment $p$ is depressed by mechanism next described, thus releasing the arm $l$ and allowing the spring bearing against it to force said arm to the other side of the space occupied by the abutment when the latter is raised, and thus engage the other half-nut with the other screw and reversing the movement of the carrier. During the ensuing movement of the carrier the arm bears against the other spring, displacing the latter, so that when the abutment $p$ is again depressed the arm $l$ will be forced by the spring last referred to back to the opposite side of the abutment, thus engaging the arm $l$ with the first screw, and so on. The abutment $p$ is raised, as hereinafter described, after each depression, so as to guide the arm $l$ in each of its movements.

The mechanism for depressing the abutment $p$ is as follows:

$r$ represents a lever adapted to oscillate vertically in a slot in a bracket or standard, $t$, affixed to the base and pivotally connected at one end to the abutment $p$, said lever being below the base $a$.

$s$ represents a spring which is suitably attached to the base and supports the lever $r$ and abutment $p$, permitting said abutment to be depressed below the lower end of the arm $l$ and raising said abutment when the same is not subjected to depressing pressure.

$u$ represents a stud adapted to slide vertically in a socket extending through the base $a$, its lower end bearing on the lever $r$.

$v$ $v'$ represent bell-crank levers, pivoted, respectively, at $w$ $w'$ to standards on the base $a$, each having a substantially-horizontal and a substantially-vertical arm. The horizontal arms of said levers bear on the upper end of the stud $u$, and their vertical arms are connected by a horizontal rod, $a'$, inserted in vertical slots $b'$ $b'$ in said arms.

The rod $a'$ passes through a sleeve, $c'$, affixed to the rear portion of the thread-carrier $i$, and is provided with a head, $d'$, (preferably adjustable,) bearing against the outer side of the vertical arms of the lever $v$, and with a nut, $f'$, (on a threaded portion of said rod,) bearing against the outer side of the vertical arm of the lever $v'$.

$g'$ represents a double cam-lever pivoted at $h'$ to the sleeve $c'$, its lower portion being located in a slot in said sleeve and adapted to bear upon the rod $a'$ within said sleeve, while its upper portion projects above the sleeve and is engaged by the forked rear end of a lever, $i'$. Said lever $i'$ extends along the thread-carrier to its front end and is pivoted at $j'$ to the thread-carrier, so as to be capable of oscillating horizontally thereon. The forward end of the lever $i'$ is provided with two downwardly-projecting flanges or "feelers," $k'$ $k^2$, which stand at opposite sides of the thread-guiding end of the thread carrier and project over the spool, their lower edges being slightly higher than the lower edge of the portion of the thread-carrier that bears on the thread on the spool, so that the feelers will not be affected by contact with the thread. The lower edges of the feelers are, however, in close proximity to the surface of the thread on the spool and are arranged to strike the heads of the spool, as hereinafter described.

The operation as a whole is as follows: The arm $l$ being engaged with the screw $e'$, as shown in Figs. 3 and 4, and the screws being rotated in the directions indicated by the arrows in Fig. 4, the thread-carrier will be moved in the direction indicated by the arrow in Fig. 1, and is thus caused to lay a course of thread upon the spool. When the movement of the carrier in the direction indicated brings the flange or feeler $k^2$ in contact with the head at the right-hand end of the spool, the lever $i'$ is arrested by such contact, and is caused to swing on its pivot by the continued movement of the carrier until its rear end, engaged, as described, with the cam-lever $g'$, turns said lever on its pivot and causes one of its cam portions to bind upon the rod $a'$, as shown in Fig. 6, thus locking the rod $a'$ to the carrier and causing the carrier to move the rod with it. This movement of the rod $a'$ causes the head $d'$ on said rod to displace the bell-crank lever $v$, as shown in Fig. 6, until said lever depresses the stud $u$, lever $r$, and abutment $p$, and thus causes the abutment to release the arm $l$, whereupon the spring $n'$ forces said arm to the opposite side of the abutment, disengaging its half-nut $m'$ from the screw $e'$ and engaging its half-nut $m$ with the screw $e$, thus reversing the motion of the thread-carrier. When the ensuing movement of the carrier brings the feeler $k'$ in contact with the opposite head of the spool, the lever $i'$ is again caused to turn and engage the cam-lever $g'$ with the rod $a'$, and said rod is moved by the carrier, so as to displace the bell-crank lever $v'$ and cause the latter to depress the lever $r$ and abutment $p$, as before. The spring $n$ then forces the arm $l$ over into engagement with the screw $e'$, and thus the movement of the carrier is again reversed. The operation continues in the manner described until the spool is filled, each course of thread being terminated by the action of the feelers $k'$ $k^2$ on the heads of the spool.

When the accumulation of thread on the spool is such that the inner surfaces of the heads are nearly covered, so that the feelers cannot engage operatively with said heads, the feelers are arrested by contact of the rod $i'$ with screws $l'$ $l'$, supported by arms $p'$ $p'$, mounted on the rod $j$, on which the carrier slides. Said arms are connected by a rod, $r'$, which bears upon the carrier $i$ and supports the arms $p'$ $p'$ at the proper height above the spool. The screws $l'$ $l'$ are adjustable in the arms $p'$ $p'$, so that their inner ends can be set to correspond to the distance between the heads of the spool, and are provided with jam-nuts $s'$ $s^2$, whereby they may be prevented from moving or turning accidentally. Springs $t'$ $t'$ are interposed between the arms $p'$ $p'$ and the standards $k$ $k$, to enable said arms and the screws $l'$ therein to yield slightly while the thread-carrier is completing its movement after the rod $a'$ has been locked to it.

A spring, $u'$, is placed between the base $a$ and the inner ends of the horizontal arms of the bell-crank levers $v$ $v'$, to restore said levers to their normal positions after they have been displaced in the manner described. A spring, $a^2$, attached to the rear end of the lever $i'$ and projecting between pins $b^2$ $b^2$ on the rear end of the carrier, normally holds said lever with its feelers at equal distances from the thread-guiding end of the carrier, as shown in Fig. 1, and permits the described swinging movements of the lever and its feelers from the position indicated.

I prefer to make the lever $i'$ in two parts or sections, 2 3, pivotally connected at 4. The section 2 has a slot, through which passes a thumb-screw, 5, which is screwed into the section 3, and when turned to place rigidly connects the two sections, so that neither can turn on the pivot 4. The object of this construction is to permit the adjustment of the feelers to make them normally exactly equidistant from the thread-guiding end of the carrier, said adjustment being effected by loosening the screw 5, turning the sections 2 3 on the pivot until the feelers are equidistant from the carrier, and then tightening the screw 5.

To insure a sufficient downward pressure of the thread-carrier and on the feelers, and prevent the feelers from sliding on the inclined surfaces of the spool-heads, I provide a weighted lever, $c^2$, which is pivoted at $e^2$ to a standard, $f^2$, and bears at one end against a lateral bar, $g^2$, affixed to or formed on the rear end of the thread-carrier $i$, said lever having an adjustable weight, $d^2$, whereby it is caused to press upwardly against the rear end of the thread-carrier, and thus exert a downward pressure on its forward end, the thread-carrier being capable of oscillating or turning on the rod $j$, as already explained. A spring or any equivalent pressure device may be used instead of the weighted lever for the purpose specified.

The spools are doffed from the spindle $c$ by means of a slide, $l^2$, fitted to slide in guides $m^2$ $m^2$ in the base $a$, and provided with a vertical arm, $n^2$, which has an orifice through which the spindle $c$ passes. Said slide has a rack, $o^2$, with which meshes a segment, $p^2$, pivoted to the base $a$ and provided with a handle, $q^2$. By moving said handle the arm $n^2$ may be forced against one end of the spool, so as to force the latter off from the spindle, as will be readily seen.

I prefer to pivot to the slide $l^2$ a plate, $n^4$, which is bent upwardly to form a vertical arm, $n^5$, which arm is normally pressed by a spring, $s^4$, away from the slide $l^2$, as shown in Figs. 1 and 1ª, but is adapted to be moved over the said slide, so as to bear against the outer end of a spool placed on the spindle $c$. The function of the arm $n^5$ is to bear against the outer end of an empty spool and press the latter to place on the spindle when the slide $l^2$ is being moved back after the filled spool has been doffed. After the empty spool is placed on the spindle, and before the slide $l^2$ is moved to its spool-holding position, the operator turns the arm $n^5$ over the slide $l^2$, and then by a reverse motion of the lever $q^2$ forces the slide back to its operative position.

It is obvious that by this device I am enabled to crowd every spool of a given length to a fixed position on the spindle, which is a decided advantage in machines of this class. A slot, $s^6$, in the plate $n^4$ allows the arm $n^5$ to be adjusted for spools of different lengths.

A modification is shown in Figs. 7, 8, and 9, in which the abutment $p$ is made in two overlapping parts, 7 8, each capable of sliding, so as to shorten and lengthen the abutment. In this case the abutment is not moved vertically, but is lengthened at the completion of each course of thread by two crossed levers, $a^4 a^4$, pivoted at $b^4$ to a fixed support and pivoted at their rear ends to arms $p^4 p^4$, formed on the parts 7 8 of the abutment. A spring, $d^4$, forces the ends of the levers apart. The forward ends of the levers bear upon the under side of the spool and are kept by the spring $d^4$ in constant contact with the inclined surfaces of the spool-heads.

It will be seen that every course of thread added to the spool forces the levers $a^4 a^4$ farther from the center of the spool and allows their ends to be opened more widely, so that the abutment is gradually lengthened by the accumulations of thread on the spool. The arm $l$ is moved beyond the ends of the abutment $p$ by each movement of the thread-carrier, and is forced across the abutment by one of the springs after passing each end of the abutment.

It is obvious that, instead of employing two screw-rods rotating in opposite directions as the means for reciprocating the thread-carrier, a single rod may be employed having a right-hand-threaded portion, 9, and a left-hand-threaded portion, 10, as shown in Figs. 11 and 12. In this case the rod $j$, on which the thread-carrier is adapted to oscillate, should reciprocate with the thread-carrier and have two arms, $f^4 f^4$, each having a half-nut, one of said arms being arranged to engage with one side of the right-hand thread of the screw-rod and the other arm with the opposite side of the left-hand thread. The arm $l$, which is pressed by the springs against the abutment $p$, will in this modification be attached to the rod $j$.

My invention is not confined to the details of mechanism herein shown and described, and said details may be variously modified without departing from the essential features of the invention.

In Fig. 1$^b$ I have shown the lever $i'$ provided at its rear end with a section, 2', which is adapted to slide crosswise of the lever $i'$ in guides formed in the latter, and is adjustably secured to the lever $i'$ by a screw, $s^5$, which serves to move the section 2' and hold it in any desired position, so as to adjust the cam-lever-holding slot in said section with reference to the lever $i'$. A spring, 10, attached at one end to the carrier $i$ and at the other end to the section 2', performs the same function as the spring $a^2$.

I claim—

1. In a machine for winding spools, the combination of a thread-carrier, impelling-screws therefor, an arm moving with the carrier and provided with half-nuts adapted to alternately engage said screws, opposed springs which are alternately displaced by and caused to press against said arm during the successive movements of the carrier, an abutment against which said arm is pressed by said springs and along which the arm is moved by the carrier, a lever or levers which are actuated by the heads of the spool, and devices, substantially as described, intermediate of said lever or levers and abutment, whereby the latter is caused to release the spring-pressed arm at the completion of each course of thread on the spool and permit said arm to be moved by one of its springs into engagement with the screw, whereby the movement of the carrier is reversed, as set forth.

2. In a machine for winding spools, the combination of a thread-carrier, impelling-screws therefor, an arm moving with the carrier and having half-nuts adapted to alternately engage said screws, opposed springs which are alternately displaced by and caused to press against said arm during the successive movements of the carrier, a movable abutment against which said arm is pressed by said springs, a lever having flanges or feelers which stand in position to be actuated by the heads of the spool, and mechanism, substantially as described, whereby the abutment is retracted by the contact of each flange or feeler with a spool-head, as set forth.

3. In a machine for winding spools, the combination of the carrier having a sleeve, $c'$, and a lever, $g'$, the impelling-screws for said carrier, the arm having the half-nuts adapted to engage alternately with said screws, the springs $n n'$, the movable abutment $p$, the bell-crank levers $v v'$, the rod $a'$, connecting the upper ends of said levers and passing through the sleeve $c'$, the support for the abutment, the stud $u$ between the inner ends of said levers and the support for the abutment, and the lever $i'$, pivoted to the carrier and having the flanges or feelers $k' k^2$ at its forward end and engaged, as described, at its rear end with the cam-lever $g'$, as set forth.

4. The combination, with the lever $i'$, having the flanges or feelers $k' k^2$, of the adjustable stops $l' l'$, whereby the lever is operated when the spool is nearly filled, as set forth.

5. The combination of the impelling-screws, the carrier, the arm $l$, having the half-nuts, the lever $i'$, pivoted to the carrier and having the flanges or feelers $k' k^2$, the movable abutment $p$, the springs $n n'$, the mechanism whereby the abutment is depressed when the lever $i'$ is arrested, the connected arms $p' p'$, having a yielding movement, as described, and the adjustable stops $l' l'$, connected to said arm and impinging against the rod $i'$ when the spool is nearly filled, as set forth.

6. The combination of the carrier, its lever $i'$, pivoted thereto, having a movable section, 2', at its rear end, means, substantially as described, for adjusting said section, the cross-rod $a'$, the cam-lever $g'$, engaged with the adjustable section 2', and a spring operating to hold said cam-lever normally out of engagement with the cross-rod $a'$.

7. The slide $l^2$, having the doffing-arm $n^2$, and the swinging arm $n^5$, combined with means to operate said slide, as set forth.

In testimony whereof I have signed my name to this specification, in the presence of two subscribing witnesses, this 12th day of August, 1886.

GEORGE H. WILKINS.

Witnesses:
S. E. BUZZELL,
F. H. MAYHEW.